(12) United States Patent
Bearden et al.

(10) Patent No.: US 8,611,370 B2
(45) Date of Patent: Dec. 17, 2013

(54) SYSTEM AND METHOD TO PROVIDE BUNDLED SERVICES THROUGH A COMMUNICATION DEVICE

(75) Inventors: Brian Bearden, Webster Groves, MO (US); Mark Magnusson, Mount Prospect, IL (US); James Rasmussen, Niles, IL (US); Timothy Tremper, San Antonio, TX (US); Billy Waugh, Eureka, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 542 days.

(21) Appl. No.: 12/618,011

(22) Filed: Nov. 13, 2009

(65) Prior Publication Data

US 2011/0116374 A1    May 19, 2011

(51) Int. Cl.
*H04L 12/66* (2006.01)

(52) U.S. Cl.
USPC .......................................... 370/463

(58) Field of Classification Search
USPC ............... 370/229–236, 254–255, 431–463
See application file for complete search history.

(56) References Cited

U.S. PATENT DOCUMENTS

| | | | |
|---|---|---|---|
| 5,719,854 A | 2/1998 | Choudhury et al. | |
| 5,884,037 A | 3/1999 | Aras et al. | |
| 6,597,670 B1 | 7/2003 | Tweedy et al. | |
| 7,072,932 B1 | 7/2006 | Stahl | |
| 7,237,032 B2* | 6/2007 | Gemmell | 709/231 |
| 7,272,115 B2* | 9/2007 | Maher et al. | 370/253 |
| 2002/0101858 A1* | 8/2002 | Stuart et al. | 370/352 |
| 2003/0182403 A1* | 9/2003 | de Bonet | 709/220 |
| 2005/0015505 A1* | 1/2005 | Kruis et al. | 709/229 |
| 2005/0080764 A1 | 4/2005 | Ito | |
| 2006/0227953 A1* | 10/2006 | Hwang | 379/201.02 |
| 2006/0262722 A1* | 11/2006 | Chapman et al. | 370/229 |
| 2006/0294350 A1 | 12/2006 | Yang et al. | |
| 2007/0005771 A1* | 1/2007 | Collet et al. | 709/226 |
| 2007/0209057 A1* | 9/2007 | Musson et al. | 725/111 |
| 2007/0256096 A1 | 11/2007 | Wilhelm | |
| 2008/0080368 A1* | 4/2008 | Fan et al. | 370/229 |
| 2008/0086564 A1* | 4/2008 | Putman et al. | 709/227 |
| 2008/0273591 A1* | 11/2008 | Brooks et al. | 375/240.01 |

OTHER PUBLICATIONS

"The Business Intelligence Guide: Telco Cross Sell and Up Sell", The Business Intelligence Guide—Telco BI Solutions <http://www.thebusinessintelligenceguide.com/industry_solutions/Telco/Cross_Sell_Up_Sell.php> Retrieved Aug. 21, 2009; 2 pages.

(Continued)

*Primary Examiner* — Kwang B Yao
*Assistant Examiner* — Juvena Loo
(74) *Attorney, Agent, or Firm* — Toler Law Group, PC

(57) ABSTRACT

Systems and method to provide bundled services through a communication device. A particular method may include determining a first bundle of services to offer a user of an end user communication device, where the first bundle of services has a total bandwidth consumption rate computed based on stored bandwidth consumption rates corresponding to services within the first bundle of services. The total bandwidth consumption rate is less than a predicted bandwidth capacity. The particular method may also include comparing a predicted bandwidth capacity to measured bandwidth statistics to identify an additional bandwidth capacity of a set of transport facilities and determining a first additional service to offer a user of the end user communication device to utilize the additional bandwidth capacity.

20 Claims, 4 Drawing Sheets

(56) References Cited

OTHER PUBLICATIONS

Eggerton, John, "Cable Industry Criticized for Trying to Up-Sell Services During DTV Transition: McSlarrow defends industry, says cable has told consumers about all options", Broadcasting & Cable, published Jun. 3, 2009, <http://www.broadcastingcable.com/article/278063-Cable_Industry_Criticized_for_Trying_to_Up_Sell_Services_During_DTV_Transition.php>; 2 pages.

* cited by examiner

SYSTEM AND METHOD TO PROVIDE BUNDLED SERVICES THROUGH A COMMUNICATION DEVICE

FIELD OF THE INVENTION

The present disclosure relates generally to providing bundled services through a communication device.

BACKGROUND

In traditional digital subscriber line (DSL) service offerings, a service provider offers a subscriber a selected physical connection. The subscriber is then offered services that are capable of being provided over the selected physical connection. By offering services based on the previously selected physical connection, the selected physical connection may not be tailored to match the requirements of the services that the subscriber uses.

DETAILED DESCRIPTION

In a particular embodiment, a method is disclosed that includes storing bandwidth consumption rates of a plurality of communication services at a storage device. The method includes identifying a location of an end user communication device. The method also includes retrieving a predicted bandwidth capacity of a set of transport facilities based at least in part on the identified location. The method also includes determining a first bundle of services to offer to a user of the end user communication device. The first bundle of services includes at least two of the plurality of communication services. The first bundle of services has a total bandwidth consumption rate computed based on each of the stored bandwidth consumption rates corresponding to each service within the first bundle of services. The total bandwidth consumption rate is less than the predicted bandwidth capacity. The method includes receiving a selection of a second bundle of services. The second bundle of services is selected from the first bundle of services. The method also includes monitoring use of the second bundle of services by the end user communication device to collect measured bandwidth statistics. The method includes comparing the predicted bandwidth consumption to the measured bandwidth statistics to identify additional bandwidth capacity of the set of transport facilities. The method also includes determining a first additional service (or an enhanced version of a current service) to offer the user of the end user communication device to utilize the additional bandwidth capacity.

In another particular embodiment, a system is disclosed that includes a set of transport facilities to enable communication between a service provider and an end user communication device. A user of the end user communication device may be offered a first bundle of services that the service provider is capable of providing to the end user communication device. Each service in the first bundle of services may have a different bandwidth requirement. Based on the services that the user selects from the offer of the first bundle of services, the system selects which of the available transport facilities will be utilized to provide the user selected services. The selection of the transport facilities is based at least partially on the bandwidth requirements of the selected services. The system may monitor the use of the selected services to determine an additional bandwidth capacity of the transport facilities. Additional services or enhanced services may be offered to the user based on the additional bandwidth capacity.

Figure 1:
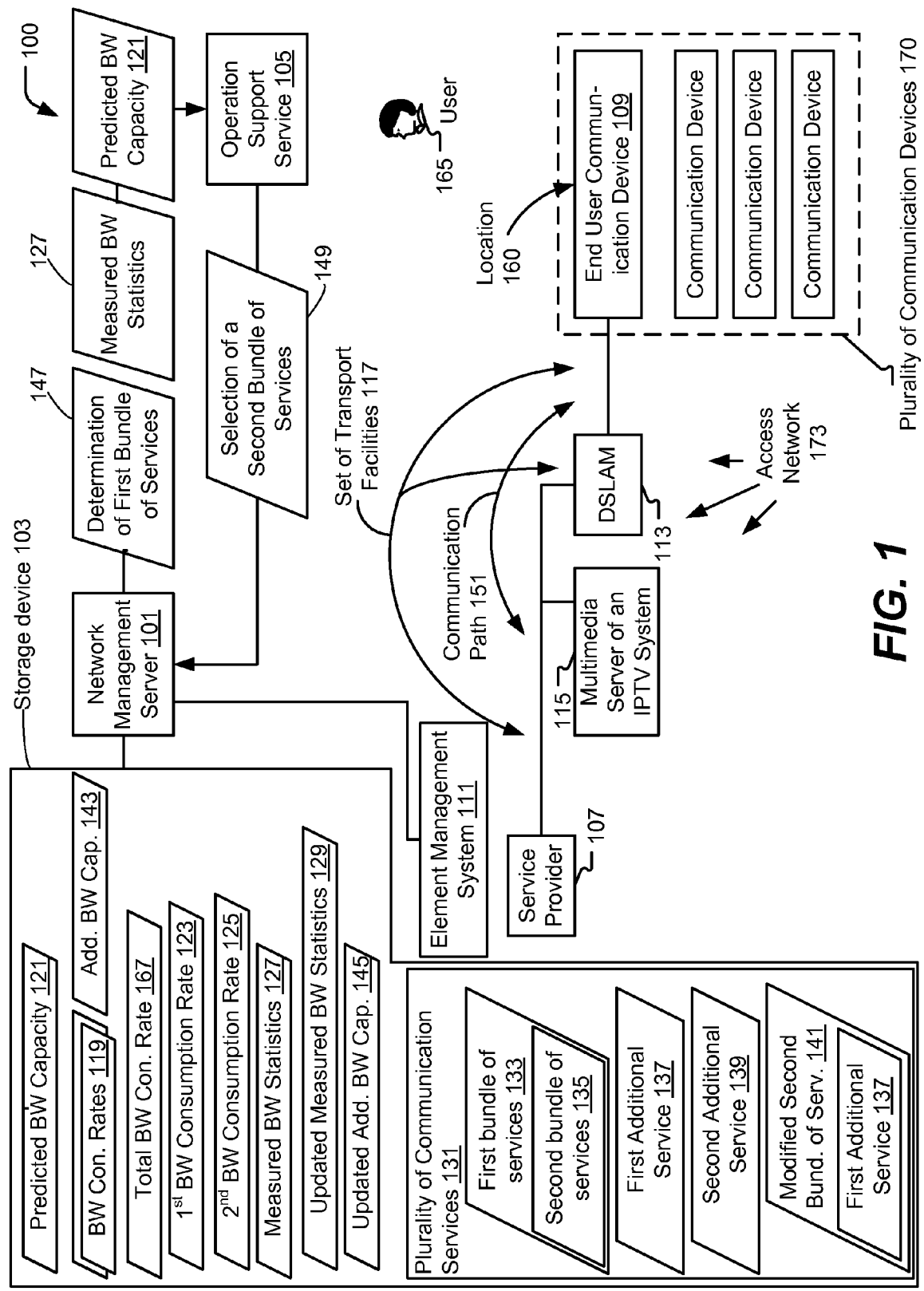
FIG. 1 is a diagram of a first embodiment of a system to provide bundled services through a communication device.

Referring to FIG. 1, a first particular embodiment of a system to provide bundled services through a communication device is depicted and generally designated 100. The system 100 includes an operation support service 105 coupled to a network management server 101. The network management server 101 is coupled to a storage device 103 and to an element management system (EMS) 111. The system 100 also includes a service provider 107 that is coupled to a multimedia server 115, a digital subscriber line access multiplexer (DSLAM) 113, and an end user communication device 109 via a set of transport facilities 117. The set of transport facilities 117 may include a communication path, such as, fiber to the node (FTTN), fiber to the curb (FTTC), fiber to the home (FTTH), other wireless or wireline transport components, or any combination thereof. The set of transport facilities 117 may be within an access network 173 that couples the multimedia server 115 of the IPTV system to a plurality of communication devices 170. In a particular embodiment, the service provider 107 is coupled to other systems, such as an Internet Protocol Multimedia subsystem (IMS) that enables the service provider 107 to provide voice and internet access to subscribers.

The system 100 enables a user 165 of the end user communication device 109 to select a second bundle of services 135 from a first bundle of services 133 based on a predicted bandwidth capability 121 of the set of transport facilities 117. After use of the selected second bundle of services 135 by the end user communication device 109, one or more additional services may be offered to the user 165. The offer of the one or more additional services may be based on a measure of additional bandwidth available. By offering an initial set of services to the user 165 based on predicted bandwidth capacity 121 and offering additional services based on measured bandwidth statistics 127, the service provider 107 may be able to increase revenue by providing more services via the set of transport facilities 117.

In a particular embodiment, the service provider 107 may include one or more servers and other devices configured to provide multimedia, telephony, or other packet-based content to one or more of the plurality of communication devices 170. The service provider 107 may be responsive to the network management server 101 to provide selected bundles of services to the individual communication devices of the plurality of the communication devices 170 via the set of transport facilities 117. The service provider 107 may receive data from the network management server 101 indicating which particular communication device (e.g., end user communication device 109) is to receive which bundle of services. The service provider 107 may be configured to enable or disable transmission of multimedia data to the plurality of communication devices 170 based on selected services and to provide service authorization information to the multimedia server 115.

In a particular embodiment, the multimedia server 115 may be configured to receive requests for multimedia access from one or more communication devices (e.g. the end user communication 109). The multimedia server 115 may verify the request for multimedia access and may provide the requested multimedia data via the access network 173. For example, the end user communication device 109 may request a streaming multimedia program, such as an internet protocol television (IPTV) program to be received at the end user communication device 109. In response, the multimedia server 115 may determine whether the end user communication device 109 is authorized to receive the program and may initiate streaming multimedia delivery to the end user communication device 109 when the end user communication device 109 is authorized to receive the program. As another example, the end user communication device 109 may request additional services, such as voice and internet service, via the set of transport facilities 117. In response, the service provider 107 may determine whether the end user communication device 109 is authorized to receive the additional service (e.g., the first additional service 137) and may initiate provisioning of the additional service to the end user communication device 109. The service provider 107 may connected with an IMS to provide the additional service. In a particular embodiment, the multimedia server 115 is configured to stream multimedia data via the access network 173, such as via one or more multicast transmissions, unicast transmissions, or a combination thereof. The IPTV system may include the access network 173 that includes the set of transport facilities 117.

The access network 173 may include one or more multimedia communication devices or equipment, such as one or more routers, bridges, servers, or other network messaging and management devices. In a particular embodiment, the access network 173 includes the digital subscriber line access multiplexer (DSLAM) 113. The DSLAM 113 may be configured to provide a multiplexing functionality to the access network 173, such as for broadcast or multicast multimedia distribution. The access network 173 may include a packet-switched network, such as an Internet Protocol (IP) network. The access network 173 may include one or more wireline or wireless network components. For example, the access network 173 may include a Bluetooth, Institute of Electrical and Electronics Engineers (IEEE) 802.11 (Wi-Fi) network, a wireless local area network (WLAN) network, one or more other networks, or any combination thereof. In a particular embodiment, the access network 173 enables distribution of multimedia content from the multimedia server 115 to the plurality of communication devices 170.

In a particular embodiment, the end user communication device 109 may be a device that is configured to receive requests for content from the user 165 and to provide a request to the service provider 107 via the access network 173. The end user communication device 109 may be configured to receive multimedia data via the access network 173 and to provide the multimedia data for display or consumption by the user 165. For example, the end user communication device 109 may include a set top box device, a mobile handset, a personal digital assistant (PDA), a portable television, a laptop computer, a smart book or net book, any other portable electronic device or stationary electronic device configured to receive multimedia data, or any combination thereof.

In a particular embodiment, the network management server 101 is configured to manage operations within the system 100. For example, the network management server 101 may be configured to access the storage device 103 to receive information from one or more components of the system 100 and to communicate with the operation support service 105.

In a particular embodiment, the storage device 103 may be configured to store information and parameters related to the network management of the system 100. For example, the storage device 103 may include data corresponding to a predicted bandwidth capacity 121, an additional bandwidth capacity 143, a first bandwidth consumption rate 123, an updated additional bandwidth capacity 145, a second bandwidth consumption rate 125, a total bandwidth consumption rate 167, and bandwidth consumption rates 119 of a plurality of communication services 131. The storage device 103 may also include data corresponding to measured bandwidth statistics 127, updated measured bandwidth statistics 129, and the plurality of communication services 131.

In a particular embodiment, the plurality of communication services 131 are services that may be offered to the user 165 of the end user communication device 109 via the operation support system 105 and provided to the end user communication device 109 via the set of transport facilities 117 by the service provider 107. The first bundle of services 133 may include services selected from the plurality of communication services 131. For example, the services (e.g., the first bundle of services 131) of the plurality of communication services 131 may include services selected from a group comprising Voice over Internet Protocol (VoIP), Internet Protocol Television (IPTV), and high speed internet access (HSIA). The second bundle of services 135 may include services selected from the first bundle of services 133. For example, the user 165 may select some or all of the services offered in the first bundle of services 133. The services that the user 165 selects may be the second bundle of services 135 that are enabled for use by the end user communication device 109. The plurality of communication services 131 may include a first additional service 137, a second additional service 139, and a modified second bundle of services 141 that includes the first additional service 137.

In a particular embodiment, the network management server 101 is configured to store the bandwidth consumption rates 119 of each of the plurality of communication services 131 at the storage device 103. The bandwidth consumption rates 119 of the plurality of communication services 131 may include estimated or actual consumption rates of bandwidth to provide one or more of the plurality of communication services 131 to the end user communication device 109 via the set of transport facilities 117. For example, the bandwidth consumption rates 119 may include an IPTV bandwidth consumption rate that indicates a prediction of bandwidth needed to provide IPTV service to the end user communication device 109. As another example, the bandwidth consumption rates 119 may include a telephone bandwidth consumption rate that indicates a prediction of bandwidth needed to provide telephone service to the end user communication device 109.

The network management server 101, in a particular embodiment, is configured to identify a location 160 of the end user communication device 109. The network management server 101 may be configured to determine the predicted bandwidth capacity 121 of the set of transport facilities 117 based on the location 160 of the end user communication device 109. The predicted bandwidth capacity 121 may be calculated based on one or more communication properties of the set of transport facilities 117, or may be based on actual or estimated data provided by another device, retrieved from the storage device, or generated by another mechanism. For example, the determination of the predicted bandwidth capacity 121 may be based on one or more physical characteristics of the communication path 151. The physical characteristics may include wire gauge, wire placement, segment length, type of wire, or other characteristics. To illustrate, a set of transport facilities (e.g., the set of transport facilities 117)

that includes FTTH may have a greater bandwidth capacity (e.g., the predicted bandwidth capacity 121) to provide services than a set of transport facilities that include FTTC.

In response to retrieving the predicted bandwidth capacity 121, the network management server 101 may be configured to determine the services (e.g., the first bundle of services 133) that are capable of being provided to the user 165 based on the predicted bandwidth capacity 121. For example, the first bundle of services 133 may include at least two services of the plurality of communications services 131.

In a particular embodiment, the first bundle of services 133 selected by the network management server 101 to be offered to the user 165 has a total bandwidth consumption rate (e.g., the total bandwidth consumption rate 167) that is computed based on each of the stored bandwidth consumption rates 119 corresponding to each service within the first bundle of services 133. The total bandwidth consumption rate 167 may be less than the predicted bandwidth capacity 121 of the set of transport facilities 117. For example, the services of the first bundle of services 133 if enabled may consume a bandwidth (e.g., the total bandwidth consumption rate 167) that is less than the predicted bandwidth capacity 121. To illustrate, the service provider 107 may provide the first bundle of services 133 to indicate to the user 165 all of the services that the set of transport facilities 117 is capable of providing to the end user communication device 109 without exceeding the predicted bandwidth capacity 121 of the set of transport facilities 117. The predicted bandwidth capacity 121 may represent an estimated amount of bandwidth that may be available for the transmission of services to the end user communication device 109.

In a particular embodiment, the network management server 101 is configured to provide a determination 147 of the first bundle of services 133 to the operation support service 105. The determination 147 may indicate which services (e.g., the first bundle of services 133) of the plurality of communication services 131 may be provided to the end user communication device 109 based on the predicted bandwidth capacity 121. For example, the operations support system 105 may create an offer to the user 165 indicating that the service provider 107 is capable of providing all of the services in the first bundle of services 133.

The network management server 101 may be further configured to receive a selection 149 of the second bundle of services 135 from the operation support service 105. The second bundle of services 135 may be selected from the first bundle of services 133, such as by the user 165 receiving a selection or list of selectable services and selecting one or more of the services for consumption. In response to receiving the selection 149 of the second bundle of services 135, the network management server 101 may be configured to initiate or instruct provision of the second bundle of services 135 to the end user communication device 109.

The network management server 101 may be configured to monitor the first bandwidth consumption rate 123 resulting from use of the second bundle of services 135 by the end user communication device 109. The network management server 101 may be configured to use the first bandwidth consumption rate 123 to determine the measured bandwidth statistics 127. For example, the network management server 101 may receive data from the set of transport facilities 117, such as data corresponding to bandwidth usage at the DSLAM 113, data representing lost packets or recent retransmission requests at the multimedia server 115, data that is received from the end user communication device 109, or any combination thereof. In a particular embodiment, the element management system 111 may be configured to provide the first bandwidth capacity rate 123 to the network management server 101.

The network management server 101 may be configured to store and use the received usage data to monitor the bandwidth consumption rates resulting from the end user communication device 109 using the second bundle of services 135. The network management server 101 may be configured to compare the predicted bandwidth capacity 121 that was used to generate the initial bundle of services 133 to the measured bandwidth statistics 127. The network management server 101 may be configured to indentify an additional bandwidth capacity (e.g., the additional bandwidth capacity 143) of the set of transport facilities 117, based in part on the comparison of the predicted bandwidth capacity 121 to the measured bandwidth statistics 127. In a particular embodiment the network management server 101 is configured to determine an additional service (e.g., the first additional service 137) to offer the user 165 of the end user communication device 109 to utilize the additional bandwidth capacity 143.

In a particular embodiment, the network management server 101 may monitor the set of transport facilities 117 that are providing the second bundle of services 135 to the user 165. For example, the first bandwidth consumption rate 123 may result from a use of the second bundle of services 135 by the end user communication device 109 to collect the measured bandwidth statistics 127. In a particular embodiment, the element management system 111 may provide the first bandwidth consumption rate 123 to the network management server 101. The network management server 101 may compare the predicted bandwidth capacity 121 to the measured bandwidth statistics 127 to identify the additional bandwidth capacity 143 of the set of transport facilities 117. The network management server 101 may determine an additional service (e.g., the first additional service 137) to offer the user 165 of the end user communication device 109 to utilize the additional bandwidth capacity 143.

In a particular embodiment, the network management server 101 may provide an indication of the first additional service 137 to the operation support service 105, which may offer the first additional service 137 to the user 165. The first additional service 137 may be an enhancement to an existing service, such as one of the services of the second bundle of services 135. For example, the existing service may be HSIA service at a first speed and the first additional service 137 may be HSIA service at a second speed. The operation support service 105 may provide an indication of an acceptance of the first additional service by the user to the network management server 101. In response to receiving the user's acceptance or selection of the first additional service 137, the network management server 101 may modify the second bundle of services 135 (e.g., the modified second bundle of services 141) to include the first additional service 137. In a particular embodiment, the set of transport facilities 117 is changed to support the first additional service 137. For example, the set of transport facilities 117 may initially include a single pair of FTTN. In response to the acceptance of additional services (e.g., the first additional service 137), the set of transport facilities 117 used to provide the modified second bundle of services to the user 165 may be upgraded from single pair FTTN to a bonded pair of FTTN. In this case, the network management server 101 may monitor a second bandwidth consumption rate 125 resulting from use of the modified second bundle of services 141 by the end user communication device 109. By monitoring the second bandwidth consumption rate 125, the network management server 101 may collect updated measured bandwidth statistics 129. Monitoring the bandwidth consumption rate may include monitoring a communication metric or figure-of-merit, such as a maximum attainable bit rate (MABR) resulting from the use of the modified second bundle of services 141.

In a particular embodiment, the network management server 101 compares the measured bandwidth statistics 127 to the updated measured bandwidth statistics 129 to identify the updated bandwidth capacity 145 of the set of transport facilities 117. Based on the results of the comparison, the network management server 101 may determine an additional service (e.g., the second additional service 139) to offer the user 165 of the end user communication device 109 to utilize the updated additional bandwidth capacity 145. The network management server 101 may provide the indication of the second additional service 139 to the operation support service 105, which may provide to the user 165 an offer of the second additional service 139. By offering services to the user 165 based on the predicted bandwidth capacity 121 and offering additional services based on the measured bandwidth statistics 127, the service provider 107 may be able to increase revenues by providing more services via the set of transport facilities 117.

Figure 2:
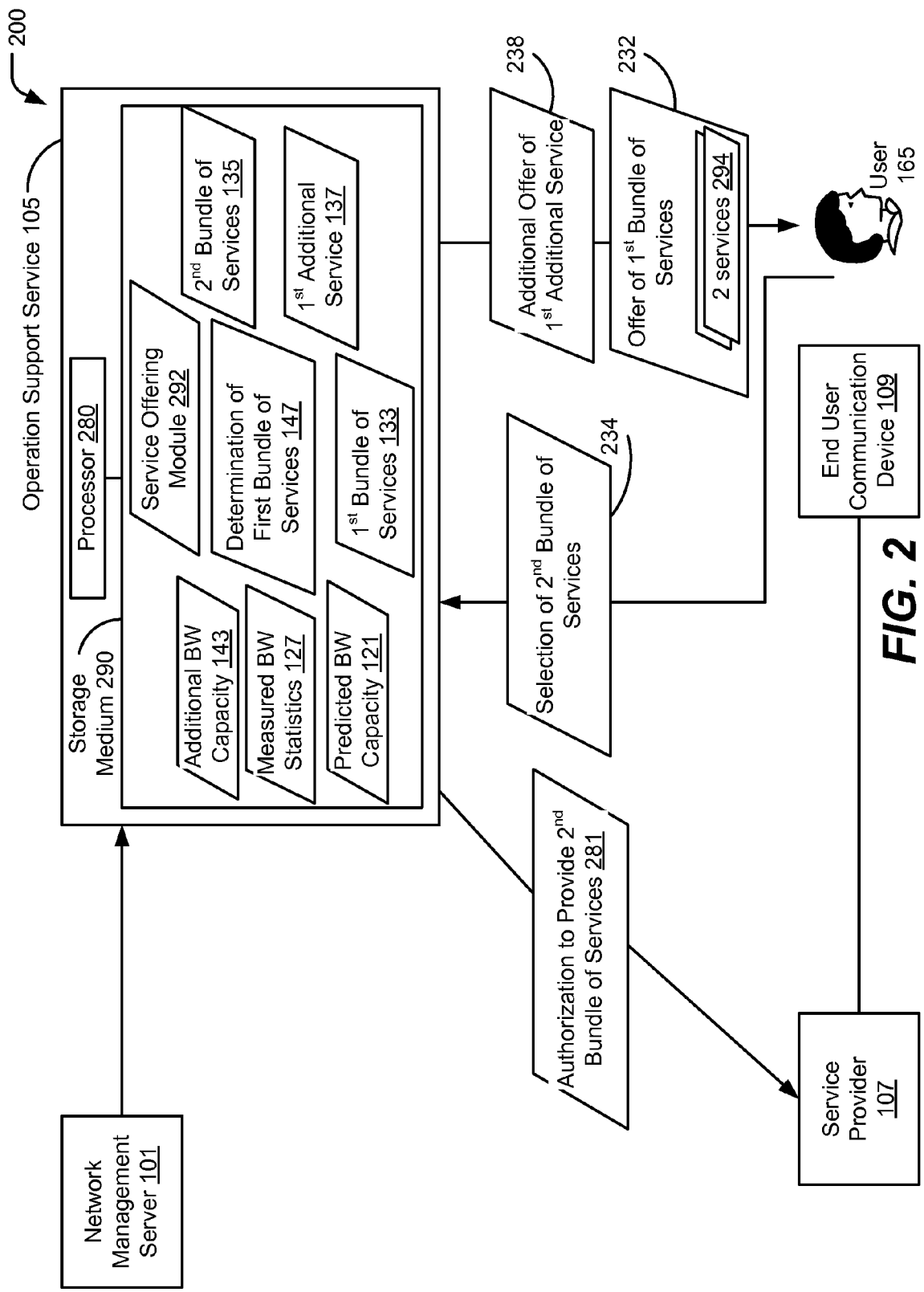
FIG. 2 is a diagram of a second embodiment of a system to provide bundled services through a communication device.

Referring to FIG. 2, another embodiment of a system to provide bundled services through a communication device is illustrated and is generally designated 200. The system 200 includes the network management server 101, the operation support service 105, the service provider 107, and the end user communication device 109 described with respect to FIG. 1. The operation support system 105 includes a processor 280 and a storage medium 290, such as a hard drive or other tangible data storage medium accessible to the processor 280. The operation support service 105 includes a service offering module 292, such as computer instructions executable by the service offering module 292 to select and initiate service offerings to the user 165.

During operation, the operation support system 105 may communicate with the user 165 to offer services that may be provided to the end user communication device 109 via the set of transport facilities 117 of FIG. 1. For example, communication may be accomplished via an automated telephone system, e-mail, or any other electronic communication. To determine which services (e.g., the first bundle of services) to offer the user 165, the operation support system 105 may retrieve the predicted bandwidth capacity 121 of the set of transport facilities 117 from the network management server 101. Alternatively, the operation support system 105 may retrieve from the network management server 101 the determination 147 of the first bundle of services 133 to offer the user 165.

In a particular embodiment, the operations support system 105 may transmit an offer 232 of the first bundle of services 133 to the user 165 based on the determination 147 of the first bundle of services 133. For example, the first bundle of services 133 indicated in the offer 232 may include two services 294. The two services 294 may include services such as IPTV service, internet service, and telephone service. In response to the offer 232, the user 165 may select some or all of the services indicated in the offer 232. For example, the user 165 may select IPTV service and internet service but not telephone service. The user 165 may indicate the selected services via a selection 234 of the selected services (e.g., the second bundle of services 135).

In a particular embodiment, the operation support system 105 may provide an authorization 281 of the second bundle of services 135 to the service provider 107. In response to receiving the authorization 281, the service provider 107 may provide the second bundle of services 135 to the end user communication device 109 via the set of transport facilities 117. The network management server 101 may monitor the set of transport facilities 117 to determine the measured bandwidth statistics 127. In a particular embodiment, the network management server 101 determines the additional bandwidth capacity based on a comparison of the measured bandwidth statistics 127 to the predicted bandwidth capacity 121. The network management server 101 may provide the operations support system 105 with the additional bandwidth capacity 143. Alternatively, the operations support system 105 may receive the measured bandwidth statistics 127 from the network management server 101 and determine the additional bandwidth capacity 143 based on a comparison of the predicted bandwidth capacity 121 and the measured bandwidth statistics 127. The additional bandwidth capacity 143 may indicate that the set of transport facilities 117 has additional bandwidth capacity to provide additional services. For example, the operations support system 105 may determine the set of transport facilities 117 has sufficient bandwidth capacity to provide the first additional service 137.

In a particular embodiment, the operations support system 105 may provide an additional offer 238 to the user 165. The additional offer 238 may include the first additional service 137. The user 165 may choose to add the additional service to the services (e.g., the second bundle of services 135) provided to the end user communication device 109. In this case, the user 165 may indicate the addition of the additional service to the operations support system 105, in which case, the operations support system 105 may authorize the service provider 107 to provide the additional service to the end user communication device 109. Offering the user 165 additional services (e.g., the first additional service 137) based on the measured bandwidth statistics 127, the service provider 107 may be able to increase revenues by providing more services via the set of transport facilities 117, thus improving usage of the set of transport facilities 117.

Figure 3:
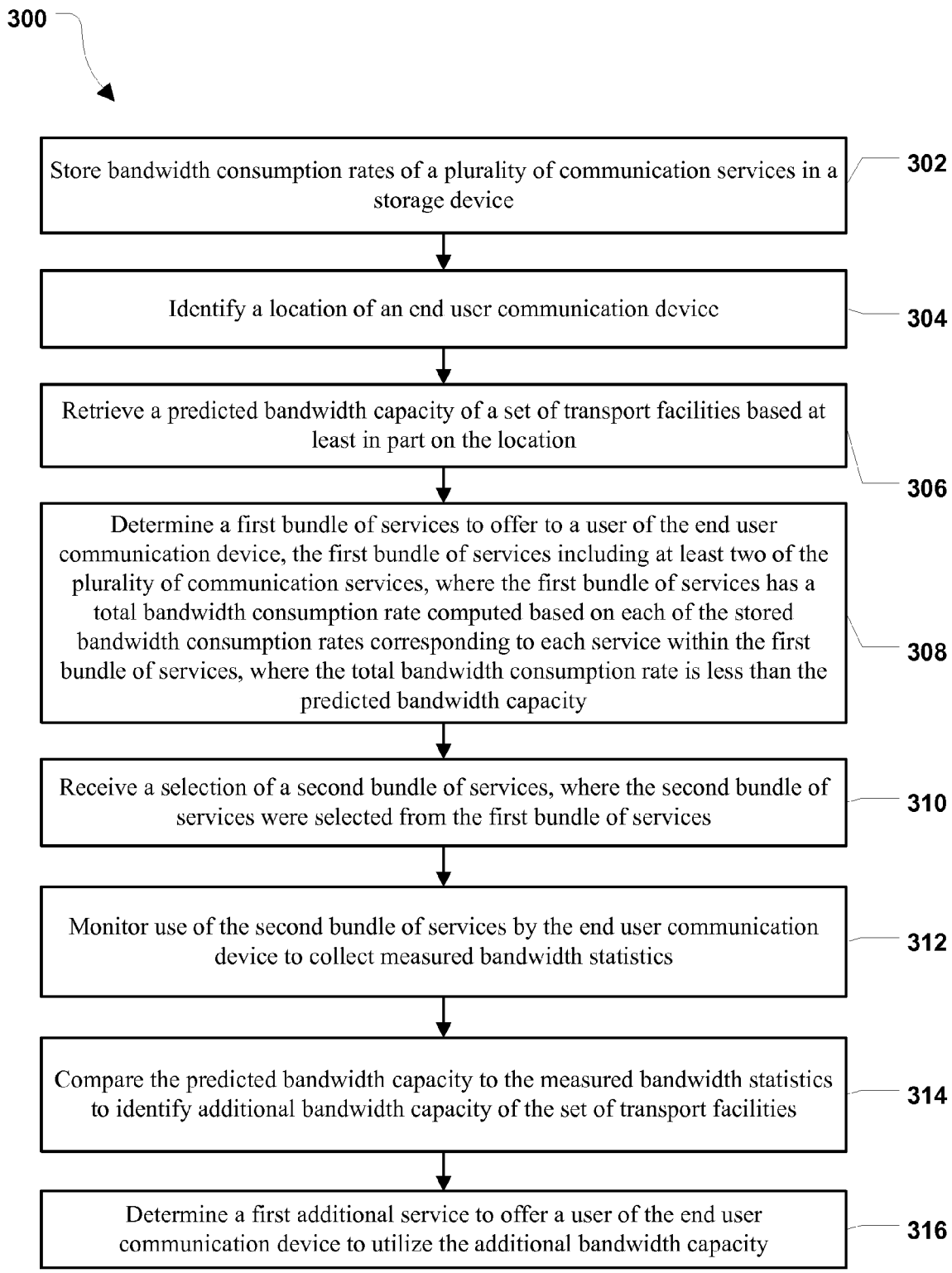
FIG. 3 is a flow diagram of a method to provide bundled services through a communication device.

FIG. 3 is a flow diagram of a method of providing a bundle of services to a communication device and is generally designated 300. In an illustrative embodiment, the method 300 is performed by any of the systems of FIGS. 1 and 2, or any combination thereof. The method 300 may include storing bandwidth consumption rates of a plurality of communication services in a storage device, at 302. For example, the network management server 101 of FIG. 1 may store the bandwidth consumption rates 119 of the plurality of communication services 131 at the storage device 103. A location of an end user communication device may be identified, at 304. For example, the network management server 101 of FIG. 1 may identify the location 160 of the end user communication device 109. A set of transport facilities based at least in part on the location may be retrieved, at 306. For example, the network management server 101 of FIG. 1 may retrieve the predicted bandwidth capacity 121 of the set of transport facilities 117 based at least in part on the location 160.

The method 300 may also include determining a first bundle of services to offer to a user of the end user communication device, the first bundle of services including at least two of the plurality of communication services, where the first bundle of services has a total bandwidth consumption rate computed based on each of the stored bandwidth consumption rates corresponding to each service within the first bundle of services, where the total bandwidth consumption rate is less than the predicted bandwidth capacity, at 308. For example, the network management server 101 of FIG. 1 may determine the first bundle of services 133 to offer to the user 165 of the end user communication device 109, the first bundle of services 133 including at least two of the plurality of communication services 131, where the first bundle of services 133 has a total bandwidth consumption rate 167 computed based on each of the stored bandwidth consumption rates 119 corresponding to each service within the first bundle of services 133. The total bandwidth consumption rate 167 may be less than the predicted bandwidth capacity 121.

The method 300 may also include receiving a selection of a second bundle of services, where the second bundle of services is selected from the first bundle of services, at 310. For example, the network management server 101 of FIG. 1 may receive the selection 149 of the second bundle of services 135, where the second bundle of services 135 is selected from the first bundle of services 133. In a particular embodiment, the second bundle of services 135 are the services that the use 165 selects from the first bundle of services 133. The method 300 may also include monitoring a first bandwidth consumption rate resulting from a use of the second bundle of services by the end user communication device to collect measured bandwidth statistics, at 312. For example, the network management server 101 of FIG. 1 may monitor the first bandwidth consumption rate 123 resulting from the use of the second bundle of services 135 by the end user communication device 109 to collect the measured bandwidth statistics 127.

The method 300 may also include comparing the first bandwidth consumption rate to the measured bandwidth statistics to identify an additional bandwidth capacity of the set of transport facilities, at 314. For example, the network management server 101 of FIG. 1 may compare the first bandwidth consumption rate 123 to the measured bandwidth statistics 127 to identify the additional bandwidth capacity 143 of the set of transport facilities 117. The method 300 may also include determining a first additional service to offer the user of the end user communication device to utilize the additional bandwidth capacity, at 316. For example, the network management server 101 of FIG. 1 may determine the first additional service 137 to offer the user 165 of the end user communication device 109 to utilize the additional bandwidth capacity 143.

Figure 4:
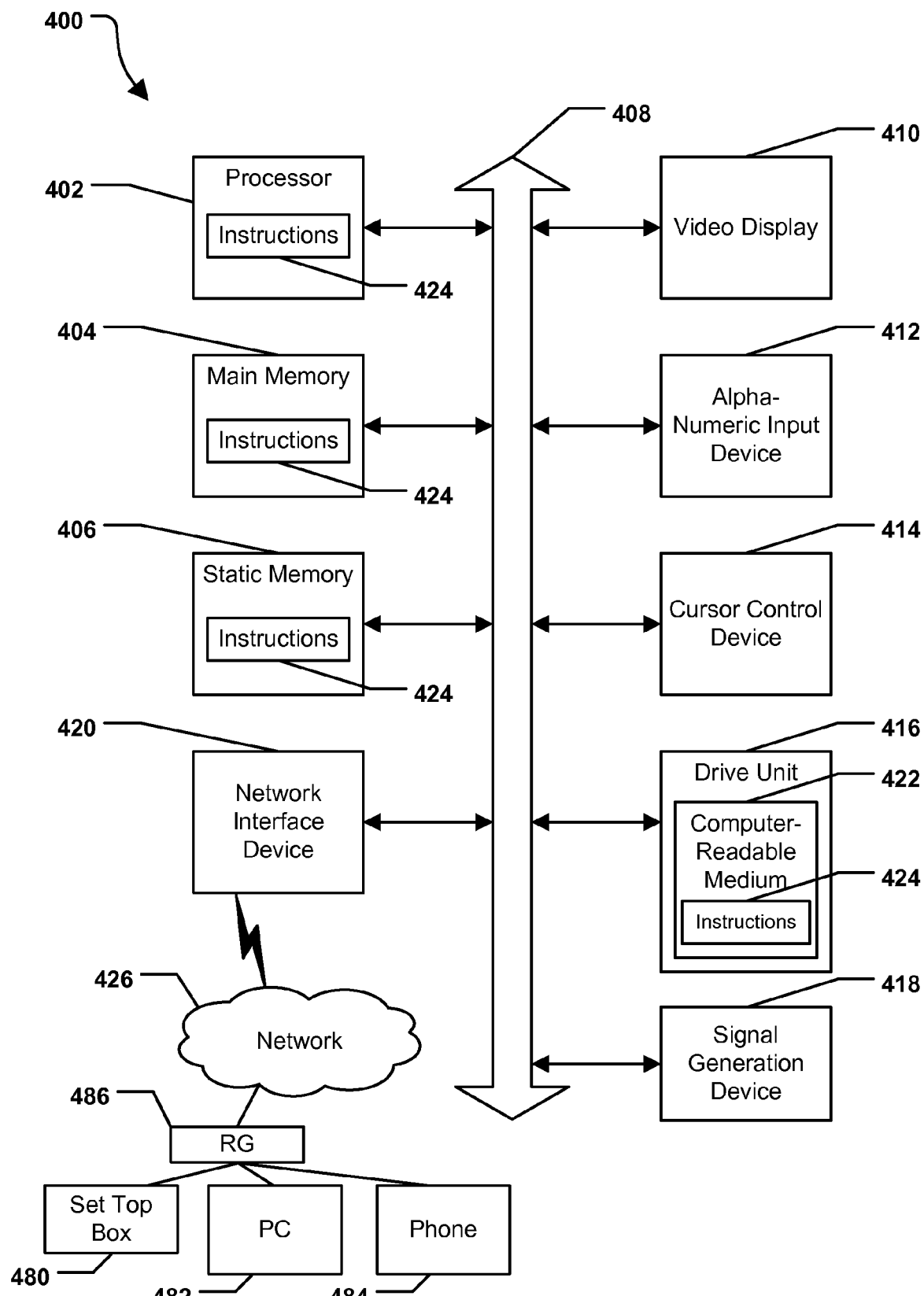
FIG. 4 is a diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein, such as some or all of the action of the method of FIG. 3. The computer system 400, or any portion thereof, may operate as a standalone device or may be connected, e.g., using a network, to other computer systems or peripheral devices.

In a networked deployment, the computer system 400 may operate in the capacity of a server. The computer system 400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics-processing unit (GPU), or both. Moreover, the computer system 400 may include a main memory 404 and a static memory 406 that can communicate with each other via a bus 408. As shown, the computer system 400 may further include a video display unit 410, such as a liquid crystal display (LCD), an organic light emitting diode (OLED), a flat panel display, or a solid-state display. Additionally, the computer system 400 may include an input device 412, such as a keyboard, and a cursor control device 414, such as a mouse. The computer system 400 can also include a disk drive unit 416, a signal generation device 418, such as a speaker, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible storage medium that is capable of storing, or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    storing bandwidth consumption rates of a plurality of communication services in a storage device;
    identifying a location of an end user communication device;
    retrieving a predicted bandwidth capacity of a set of transport facilities based at least in part on the location;
    determining a first bundle of services to offer to a user of the end user communication device, the first bundle of services including at least two communication services of the plurality of communication services, wherein the first bundle of services has a first total bandwidth consumption rate computed based on each of the stored bandwidth consumption rates corresponding to each service within the first bundle of services, and wherein the first total bandwidth consumption rate is less than the predicted bandwidth capacity;
    receiving a selection of a second bundle of services, wherein the second bundle of services is selected from the first bundle of services;
    monitoring use of the second bundle of services to collect measured bandwidth statistics, the second bundle of services used via the end user communication device;
    comparing the predicted bandwidth capacity to the measured bandwidth statistics to identify additional bandwidth capacity of the set of transport facilities;
    determining a first additional service to be offered to the user of the end user communication device to utilize the additional bandwidth capacity; and
    initiating an upgrade of at least one existing transport facility of the set of transport facilities to an upgraded transport facility based on the first additional service.

2. The method of claim 1, further comprising:
    modifying the second bundle of services to include the first additional service; and
    monitoring use of the modified second bundle of services to collect updated measured bandwidth statistics, the modified second bundle of services used via the end user communication device.

3. The method of claim 2, further comprising:
    comparing the measured bandwidth statistics to the updated measured bandwidth statistics to identify an updated additional bandwidth capacity of the set of transport facilities; and
    determining a second additional service to be offered to the user of the end user communication device to utilize the updated additional bandwidth capacity.

4. The method of claim 1, wherein monitoring the use of the second bundle of services includes monitoring a maximum attainable bit rate resulting from the use of the second bundle of services, and wherein monitoring the use of the second bundle of services includes receiving a second total bandwidth consumption rate associated with the second bundle of services from an element management system.

5. The method of claim 1, wherein the predicted bandwidth capacity, a determination of the first bundle of services, and the measured bandwidth statistics are provided to an operational support system, and wherein selection of the second bundle of services is received from the operation support system.

6. The method of claim 1, wherein the set of transport facilities includes transport facilities selected from Fiber to Node, Fiber to Curb, Fiber to Home, and a digital subscriber line access multiplexer, or a combination thereof.

7. The method of claim 1, wherein the first bundle of services includes at least one of a Voice over Internet Protocol service, an Internet Protocol Television service, or a high speed internet access service.

8. The method of claim 1, wherein the at least one existing transport facility includes a single pair of fiber to node, wherein the upgraded transport facility includes a bonded pair of fiber to node, and wherein the upgrade of the at least one existing transport facility of the set of transport facilities to the upgraded transport facility includes replacing the single pair of fiber to node with the bonded pair of fiber to node.

9. The method of claim 1, further comprising receiving data from the set of transport facilities, wherein the data received from the set of transport facilities includes data representing lost packets, data representing recent retransmission requests, or a combination thereof.

10. The method of claim 1, wherein the upgrade of the at least one existing transport facility to the upgraded transport facility is initiated in response to receiving a selection of the first additional service.

11. The method of claim 1, wherein the upgrade of the at least one existing transport facility to the upgraded transport facility changes the predicted bandwidth capacity of the set of transport facilities.

12. A computer readable device storing processor executable instructions that, when executed by the processor, cause the processor to perform a method comprising:
    offering a first bundle of services to a user of an end user communication device, wherein the first bundle of services includes at least two communication services of a plurality of communication services, the first bundle of services having a total bandwidth consumption rate computed based on stored bandwidth consumption rates corresponding to each service within the first bundle of services, and wherein the total bandwidth consumption rate is less than a predicted bandwidth capacity of a set of transport facilities, the predicted bandwidth capacity based at least in part on a location of the end user communication device;
    receiving a selection of a second bundle of services, wherein the second bundle of services is selected from the first bundle of services;
    authorizing the second bundle of services to be used by the end user communication device with respect to the set of transport facilities;
    in response to an identification of an additional bandwidth capacity of the set of transport facilities, the identification based on measured bandwidth statistics corresponding to use of the second bundle of services, the second bundle of services used via the end user communication device, providing to the user of the end user communication device an indication of an additional service that is available to the end user communication device based on the additional bandwidth capacity; and
    initiating an upgrade of at least one existing transport facility of the set of transport facilities to an upgraded transport facility based on the additional service.

13. The computer readable device of claim 12, wherein the predicted bandwidth capacity and the measured bandwidth statistics are received from a network management server that is coupled to the set of transport facilities.

14. The computer readable device of claim 12, wherein the method further comprises offering the first bundle of services to the user automatically via at least one of e-mail or an automated telephone system.

15. A system comprising:
    a set of transport facilities to enable communication between a service provider and an end user communication device,
        wherein the set of transport facilities is configured in a first configuration to provide a first bundle of services to the end user communication device, the first bundle of services including at least two services selected at least partially based on a predicted bandwidth capacity of the set of transport facilities;
        wherein the set of transport facilities is configured in the first configuration to provide a second bundle of services to the end user communication device, the second bundle of services selected from the first bundle of services; and
        wherein the set of transport facilities is configured in a second configuration to provide a modified bundle of services to the end user communication device, the modified bundle of services including the second bundle of services and an additional service, the additional service selected at least partially based on an additional bandwidth capacity that is indicated by measured bandwidth statistics of use of the second bundle of services by via the end user communication device, and wherein a change from the first configuration to the second configuration includes upgrading at least one transport facility of the set of transport facilities to an upgraded transport facility to support the additional service.

16. The system of claim 15, wherein the set of transport facilities includes at least one digital subscriber line access multiplexer and a communication path.

17. The system of claim 16, wherein the predicted bandwidth capacity is based at least partially on a physical characteristic of the communication path, the physical characteristic of the communication path including a segment length.

18. The system of claim 16, wherein the predicted bandwidth capacity is based at least partially on a physical characteristic of the communication path, the physical characteristic of the communication path including a wire gauge.

19. The system of claim 15, wherein the set of transport facilities is coupled to at least one multimedia server of an internet protocol television system, wherein the internet protocol television system includes an access network comprising the set of transport facilities, and wherein the access network enables distribution of multimedia content from the multimedia server to a plurality of end user communication devices.

20. The system of claim 16, wherein the predicted bandwidth capacity is based at least partially on a physical characteristic of the communication path, the physical characteristic of the communication path including a placement of a wire associated with the communication path.

* * * * *